Jan. 13, 1953    E. R. POWELL    2,625,512
EXPANDED PERLITE INSULATION AND METHOD OF MANUFACTURE
Filed April 29, 1948
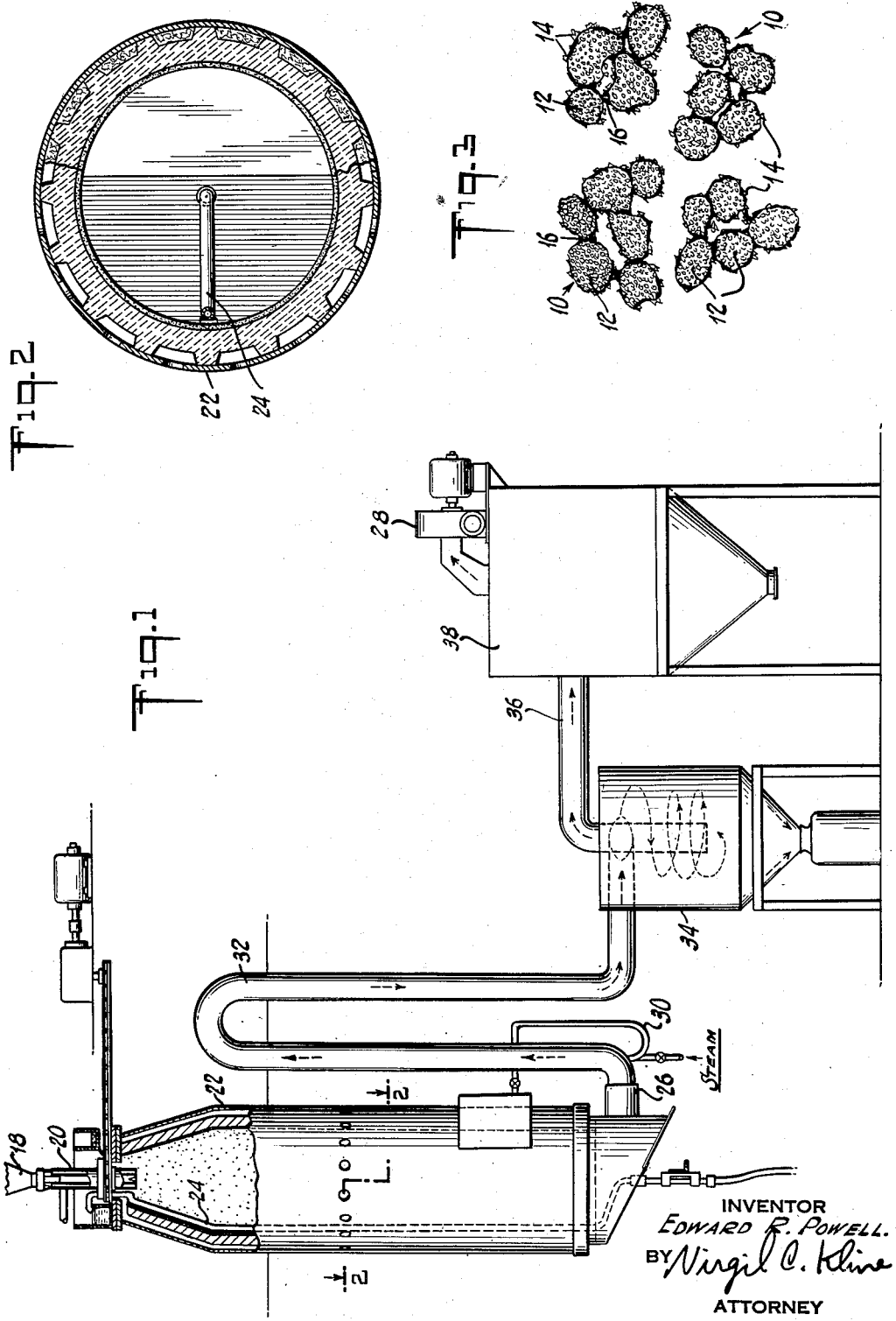
INVENTOR
EDWARD R. POWELL.
BY Virgil C. Kline
ATTORNEY Patented Jan. 13, 1953

2,625,512

UNITED STATES PATENT OFFICE 2,625,512

EXPANDED PERLITE INSULATION AND METHOD OF MANUFACTURE

Edward R. Powell, North Plainfield, N. J., assignor to Johns-Manville Corporation, New York, N. Y., a corporation of New York Application April 29, 1948, Serial No. 24,063

3 Claims. (Cl. 252—62)

This invention is concerned with a novel expanded perlite agglomerate of very low density which in bulk form has resistance to moisture penetration and settling or compacting to a degree which makes it attractive for use as loose fill heat insulation, and a method of producing such material.

Perlite is a volcanic glass of unusual composition. A chemical analysis of perlite generally shows a silica content of 65-70% by weight, an alumina content of 12-16%, a water content of 2-6%, and small amounts of the oxides of sodium, potassium, calcium and magnesium. By reason of the presence of a substantial amount of water in its structure, crude or raw perlite in finely divided form can be flash heat expanded to produce cellular grains or glass-walled bubbles and bubble clusters of low density and good resistance to fairly high temperature and to attack by moisture and many chemicals.

Properly expanded perlite has certain properties which detract from its value for use as loose fill heat insulating material for the walls of houses and of refrigeration or heating units. Such expanded perlite is a physically fragile material which cannot be handled mechanically without developing excessive amounts of fine dust. Moreover the expanded perlite is so finely divided and free flowing that excessive amounts thereof tend to be lost by outflow through fine cracks in enclosing wall structures. Even when dry the heat expanded perlite in bulk form has a tendency to settle and compact, thereby reducing its insulating properties. The material is easily wetted by water and in bulk form has a tendency to take up and retain water to an extent which has a serious adverse effect on its value as a loose fill heat insulating material.

According to the present invention such disadvantages of conventional finely divided heat expanded perlite have been met by treatment with a small amount of a water repellent normally solid adhesive following a treating cycle developing an agglomerate of greatly enhanced value as a loose fill heat insulation material.

Principal objects of the present invention are to provide an improved expanded perlite agglomerate granule which in bulk form has exceptionally low density, and which resists moisture penetration, settling or compacting, dusting, and flow escape through cracks.

Another object is to provide an economical and efficient method of producing such expanded perlite agglomerate granule.

A further object is to provide an agglomerate granule form of expanded perlite having improved properties adapting it for use as a loose fill heat insulating material.

With the above and other objects in view, the invention consists in the improved expanded perlite agglomerate and method of manufacture which are hereinafter described and more particularly defined in the accompanying claims.

In the following description reference will be made to the accompanying drawings, in which:

Fig. 1 portrays in elevation, with parts in vertical section, a perlite expanding furnace and agglomerating unit adapted for producing the desired product;

Fig. 2 is a horizontal sectional view of the expanding furnace, taken on the plane 2—2 of Fig. 1; and Fig. 3 is a highly magnified perspective view of a few typical expanded perlite agglomerate granules such as form the subject of the invention, illustrating some of the various forms of expanded perlite closed cell bubbles and bubble custer particles and cell fragments which go to make up an agglomerate granule.

The product which is portrayed in Fig. 3 consists of agglomerate granules 10 of expanded perlite particles. Each granule consists of a collection of closed cell bubbles and bubble clusters 12 and open cell fragments 14 of heat expanded cellular perlite, together with a relatively small amount of a water repellent solid adhesive originally deposited in situ and dispersed in discontinuous thin films 16 or fine droplets over the perlite and adhering several perlite bubbles and fragments together into a coherent granule. In bulk form the granules have high water repellence, low bulk density and suitable flow characteristics for use as loose fill insulation. A preferred adhesive comprises the non-volatile fraction of a bituminous material or paraffin or montan wax that is solid and resilient and slightly tacky at ordinary temperatures, and which possesses water repellence and adhesive characteristics, together with stability over a wide temperature range. The adhesive may incorporate some natural or synthetic resin such as a heat hardenable accroides or phenolic resin to develop added bonding strength.

The present method of manufacturing such agglomerate granules of heat expanded perlite is not limited to the illustrated embodiment portrayed in the drawings. Any perlite expanding operation may be used by which finely divided crude perlite is dispersed in a carrier stream of hot combustion gases and subjected to flash heat treatment at a temperature at which heat softening and expansion of the perlite particles develops. The hot gas suspension of expanded perlite particles is quickly removed from the heat expansion zone and rapidly cooled to preserve the low density particle form. A suitable high melting point adhesive such as asphalt or petroleum wax is introduced in liquified or emulsified form as a fine fog dispersion into the gas suspension while the gas suspension retains a temperature of 600–1200° F. The binder is thus distributed throughout the gas suspension and as the gas is further cooled a non-volatile fraction of the binder coalesces as fine droplets or discontinuous films 16 on the surfaces of individual expanded perlite particles. The gas dispersed coated particles which result from this treatment are conducted while still hot through a zone of turbulence in which the coated particles tend to impinge on one another to form finely divided low density particle agglomerate granules in which several particles are loosely held together. The resulting agglomerate granules after cooling to normal temperature are substantially non-tacky and exhibit in bulk form non-settling and water repellent properties and granular flow characteristics which make them ideal as a loose fill insulation material.

Referring to Fig. 1 of the accompanying drawings, a suitable method of manufacturing the loose fill agglomerate granules is as follows: Crude perlite is ground to a size fine enough to pass through a standard 20 mesh screen and coarse enough so that most of it will be retained on a standard 200 mesh screen. The finely divided perlite particles are charged at a controlled rate from a hopper 18 into a carrier stream of secondary air which feeds a dispersion thereof to the center of a fluid fuel flame issuing from the mouth of an annular burner 20 into the top of a vertical shaft furnace 22. As the perlite particles are carried through the furnace in gas suspension they are rapidly heated to temperatures in the range 1700–2100° F. by the surrounding flame. At this temperature the particles quickly soften and expand or puff to an average density of 2–4 lbs./cu. ft. A water cooled rotary scraper 24 may be provided to limit build up of fused expanded perlite on the furnace wall lining. The thus expanded particles are carried downwardly in suspension in the gaseous products of combustion and exit from the base of the furnace through flue pipe 26 under a draft created by a fan 28. Rapid cooling of the gas suspended particles may be effected within the flue 26 by dilution with air or by heat radiation. This heat expansion operation may be practiced with upward flow of gas and suspended particles through the expansion zone.

At a point in flue pipe 26 at which the temperature of the gas suspension of expanded perlite particles had dropped within the range 600–1200° F., a measured amount of asphalt, petroleum tar, wax, or other suitable binder is introduced at a controlled rate from a valved feed pipe 30. The binder is atomized, in solvent reduced or emulsified liquid form, into the hot gas suspension of expanded perlite particles, preferably by means of steam, thereby developing a fine dispersion of the binder in a liquid mist or fog. As the gas suspension of perlite particles and binder fog or mist advances in turbulent flow through an extension 32 of flue 26, the temperature thereof rapidly drops. A non-volatile portion of the binder contacts with and coalesces in fine droplets or thin discontinuous films on the surfaces of the perlite particles. Any water or volatile material associated with the binder at the time it is introduced to the flue 32 is quickly evaporated by the heat still present in the gaseous suspension. The gaseous suspension of thus coated particles then enters the top of a cyclone separating chamber 34.

In traversing the flue extension 32 and the upper portion of the cyclone 34 around its offtake, sufficient turbulence is set up in the gas suspension so that binder coated particles collide and agglomerate into agglomerate granules. Also during the later part of this period of turbulence the temperature of the carrier gas and coated particles drops to a point at which the binder droplets or films 16 solidify. The agglomerate granules are finally thrown out of the suspending gas stream and are collected at the base of the cyclone 34. Any coated particles or agglomerate granules which are not separated from gas suspension within cyclone 34 are carried over by a flue extension 36 into an air filter 38, and are separated therein from the cooled gases entering the fan 28.

The waterproofing adhesive may be petroleum wax or asphalt having a melting point of about 140° F. minimum, a flash point of about 375° F. minimum, and which, in solvent reduced or water emulsified form, can be gas dispersed by mechanical or steam atomizing to form a vapor or a fine mist. That fraction of the vapor or fine mist form of binder which is not volatilized by exposure for a few seconds to temperatures of 600–1200° F. (for example 900° F.) tends to coalesce on and adhere to the surfaces of the expanded perlite particles, without any serious tendency under these conditions to adhere to and build up on the metal wall of the flue 32. The binder which originally condenses or collects and coalesces in fine droplets on the perlite particles is hardened to solid substantially non-tacky form as soon as the suspending gas temperature drops below the melting point of the binder, and below this temperature the solid binder retains sufficient pliability and resilience to form an ideal density stabilizer and water repellent agglomerate adhesive.

In proceeding as prescribed using a binder comprising chiefly asphalt or paraffin wax, it is possible to obtain agglomerate granules of adequate resistance to settling or compacting and having adequate waterproofness, when using binder proportions that range from 1–5% by weight of binder based on the weight of expanded perlite.

The comparatively high resistance to compacting and moisture penetration of the expanded perlite agglomerate granules in bulk form, despite the presence of only a relatively small amount of high melting point asphalt or wax binder at the surfaces and within the interstices of the individual granules, results from the fact that such binder holds the perlite granules and particles in fixed spaced relation and imparts water repellency adequate to prevent substantial "wicking" or capillary penetration or adsorption of moisture into the interior pores of the bulk material. This agglomerate granule form of expanded perlite exhibits exceptionally low and stable bulk density, with resulting low thermal conductivity and high heat insulating properties. A product produced by the present process has a stable bulk density as low as 2–2.5 lbs./cu. ft. A product of this density can only be produced by a thorough and rapid flash heat expansion treatment of finely divided crude perlite, followed by contact coating of the expanded product while still hot and while undergoing rapid cooling with a fog dispersion of small amounts of water repellent adhesive such as wax or asphalt, and agglomeration of lightly coated particles in gas dispersion before the binder hardens as the cooling operation proceeds. Thus agglomerated granules in bulk form have at least approximately twice the resistance to severe vibration compacting and much improved flow properties and resistance to dusting and moisture absorption, as compared to expanded perlite particles which have not been so agglomerated.

The invention which has been thus described by detailed example is not limited as to such details and it is to be understood that variations, changes and modifications are contemplated within the scope of the invention as defined by the following claims.

What I claim is:

1. A process of manufacturing finely divided low density material suitable for use as loose fill insulation which comprises, flash heat expanding finely divided perlite and partially cooling the expanded perlite particles while in hot gas suspension, mixing with said hot gas suspension a fog dispersion of finely atomized water repellent normally solid thermoplastic adhesive at a temperature at which a non-volatile fraction of the adhesive adheres to the perlite particle surfaces in discontinuous thin film form, agitating the gas suspension of thus coated particles to form agglomerate granules, and cooling the agglomerate granules to solidify the adhesive films.

2. A process of manufacturing loose fill insulation material which comprises, flash heat expanding finely divided perlite while dispersed in hot gas suspension, partially cooling the gas suspension of heat expanded particles to about 600–1200° F. and admixing therewith a fog dispersion of water repellent solid thermoplastic adhesive at a temperature and degree of turbulence at which minute droplets of a non-volatile fraction of the adhesive adhere to the particle surfaces, and further agitating and cooling the gas suspension to form agglomerate granules of thus coated particles and to solidify the adhesive droplets on the perlite particle surfaces.

3. A process of manufacturing loose fill insulation material which comprises, flash heat expanding finely divided perlite while dispersed in hot gas suspension, partially cooling the gas suspension of heat expanded particles and mixing therewith a fog dispersion of water repellent bituminous high melting point binder whereby fine films of the binder material are deposited on the surfaces of the perlite particles, and agitating and further cooling the gas suspension to agglomerate the particles and to solidify the binder films.

EDWARD R. POWELL.

REFERENCES CITED

The following references are of record in the file of this patent:

UNITED STATES PATENTS

| Number | Name | Date |
|---|---|---|
| Re. 20,119 | Sommer | Sept. 22, 1936 |
| 1,197,956 | Sabine | Sept. 12, 1916 |
| 1,230,381 | Comerman | June 19, 1917 |
| 1,972,390 | Miner | Sept. 4, 1934 |
| 2,059,983 | Dent et al. | Nov. 3, 1936 |
| 2,209,679 | Fowler | July 30, 1940 |
| 2,263,099 | Olsen | Nov. 18, 1941 |
| 2,289,250 | Denning | July 7, 1942 |
| 2,388,060 | Hicks | Oct. 30, 1945 |
| 2,445,928 | Sommer | July 27, 1948 |

FOREIGN PATENTS

| Number | Country | Date |
|---|---|---|
| 390,189 | Great Britain | Mar. 27, 1933 |

OTHER REFERENCES

Department of Interior, Information Circular 7364, by Ralston, August 1946.